(12) United States Patent
Oh et al.

(10) Patent No.: US 12,511,523 B2
(45) Date of Patent: Dec. 30, 2025

(54) DATA PROCESSING DEVICE OF SPIKE NEURAL NETWORK AND DATA PROCESSING METHOD THEREOF

(71) Applicant: ELECTRONICS AND TELECOMMUNICATIONS RESEARCH INSTITUTE, Daejeon (KR)

(72) Inventors: Kwang Il Oh, Daejeon (KR); Tae Wook Kang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 1028 days.

(21) Appl. No.: 17/308,723

(22) Filed: May 5, 2021

(65) Prior Publication Data
US 2021/0383192 A1 Dec. 9, 2021

(30) Foreign Application Priority Data

Jun. 5, 2020 (KR) .................. 10-2020-0068530
Oct. 14, 2020 (KR) .................. 10-2020-0132344

(51) Int. Cl.
*G06N 3/04* (2023.01)
*G06F 7/58* (2006.01)
*G06N 3/049* (2023.01)
*G06N 3/08* (2023.01)

(52) U.S. Cl.
CPC .............. *G06N 3/049* (2013.01); *G06F 7/58* (2013.01); *G06N 3/08* (2013.01)

(58) Field of Classification Search
CPC ............. G06N 3/049; G06N 3/08; G06F 7/58
See application file for complete search history.

(56) References Cited

U.S. PATENT DOCUMENTS

| 9,053,428 | B2 | 6/2015 | Hunzinger et al. |
| 11,037,054 | B2* | 6/2021 | Davies ................. G06N 3/088 |
| 2016/0042271 | A1 | 2/2016 | Yoon et al. |
| 2016/0242690 | A1* | 8/2016 | Principe ............... A61B 5/316 |
| 2019/0385055 | A1 | 12/2019 | Sim |

(Continued)

FOREIGN PATENT DOCUMENTS

| KR | 101512370 B1 | 4/2015 |
| KR | 101596656 B1 | 2/2016 |

(Continued)

OTHER PUBLICATIONS

Petro, "Selection and Optimization of Temporal Spike Encoding Methods for Spiking Neural Networks", IEEE, 2020 (Year: 2020).*

(Continued)

*Primary Examiner* — Van C Mang

(57) ABSTRACT

Disclosed is a data processing device of a spike neural network. The data processing device according to the present disclosure includes an input terminal that receives time series data, a processor that differentiates the input time series data, determines a point at which a differential value of the time series data is "0", and generates an output in a discrete form, based on the determination result, and an output terminal that generates a spike train signal, based on the output and outputs the generated spike train signal to external axons.

13 Claims, 7 Drawing Sheets

(56) References Cited

U.S. PATENT DOCUMENTS

| | | |
|---|---|---|
| 2019/0392291 A1 | 12/2019 | Park et al. |
| 2020/0074272 A1 | 3/2020 | Okazawa et al. |
| 2020/0243099 A1 | 7/2020 | Beack et al. |

FOREIGN PATENT DOCUMENTS

| | | |
|---|---|---|
| KR | 20170041724 A | 4/2017 |
| KR | 20190143027 A | 12/2019 |
| KR | 10-2020-0060204 A | 5/2020 |
| KR | 20200094354 A | 8/2020 |

OTHER PUBLICATIONS

Sho Hashimoto, "A Novel Hybrid Spiking Neuron: Bifurcations, Responses, and On-Chip Learning", IEEE, 2010 (Year: 2010).*

Yang Xu, "Spike Trains Encoding and Threshold Rescaling Method for Deep Spiking Neural Networks", IEEE, 2018 (Year: 2018).*

Jiminez, "Building Blocks for Spikes Signals Processing", IEEE, 2010 (Year: 2010).*

Mohammadi "Spike Detection Based on the Adaptive TimeâFrequency Analysis" (Year: 2018).*

"Stochastic spike train generation", Elephant 0.7.0 documentation, Web page URL:https://elephant.readthedocs.io/en/v0.7.0/reference/spike_train_generation.html, Mar. 3, 2020.

\* cited by examiner

DATA PROCESSING DEVICE OF SPIKE NEURAL NETWORK AND DATA PROCESSING METHOD THEREOF

CROSS-REFERENCE TO RELATED APPLICATIONS

This application claims priority under 35 U.S.C. § 119 to Korean Patent Application Nos. 10-2020-0068530, filed on Jun. 5, 2020, and 10-2020-0132344, filed on Oct. 14, 2020, respectively, in the Korean Intellectual Property Office, the disclosures of which are incorporated by reference herein in their entireties.

BACKGROUND

Embodiments of the present disclosure described herein relate to a data processing device and a data processing method of a spike neural network, and more particularly, relate to a device and a data processing method that process data input in time series as discrete data.

To perform an operation in a spike neural network (SNN), a form of a signal transmitted within the network should have a form of a spike, and a form of data or a signal input to the spike neural network should also be in a form of a discrete signal having only a high or low magnitude, not a continuous value.

Accordingly, when the form of initial data input to the spike neural network is continuous and time-varying time series data, there is a need for a data processing device that converts input time series data into the form of the spike.

SUMMARY

Embodiments of the present disclosure provide a data processing device that converts time series data into discrete data.

In addition, embodiments of the present disclosure provide a data processing device that determines a maximum value and a minimum value of time series data by providing a processor including a differentiator in converting time series data into discrete data.

According to an embodiment of the present disclosure, a data processing device includes an input terminal that receives time series data, a processor that differentiates the input time series data, determines a point at which a differential value of the time series data is "0", and generates an output in a discrete form, based on the determination result, and an output terminal that generates a spike train signal, based on the output and outputs the generated spike train signal to external axons.

According to an embodiment, the processor may determine the output as a value of "1" when the differential value of the time series data is "0".

According to an embodiment, the processor may determine a maximum value point or a minimum value point of the time series data, based on the differential value of the time series data.

According to an embodiment, the output terminal may generate a first signal having a first frequency at the maximum value point or the minimum value point of the time series data.

According to an embodiment, the output terminal may generate a second signal having a second frequency which has a value lower than the first frequency at a point where the differential value of the time series data is positive or negative.

According to an embodiment, the output terminal may further include an index register storing the spike train signal before transmitting the spike train signal to the axons.

According to an embodiment, the output terminal may include a first random number generator that generates first random numbers, and a second random number generator that generates second random numbers having a frequency of occurrence lower than that of the first random numbers, and the output terminal may adjust the frequency of occurrence of the spike train signal, based on the first random numbers and the second random numbers.

According to an embodiment, the output terminal may further include an oscillator that generates an axon index signal, and allows the output of the processor to be stored in the index register, based on the axon index signal.

According to another embodiment of the present disclosure, a data processing method of a spike neural network includes receiving time series data through an input terminal, differentiating the input time series data, determining a point at which a differential value of the time series data is "0", and generating an output value in a discrete form, based on the determination result, and generating a spike train signal, based on the output value, and outputting the generated spike train signal to external axons.

According to an embodiment, the generating of the output value may include determining the output value as a value of "1" when the differential value of the time series data is "0".

According to an embodiment, the generating of the output value may include determining a maximum value point or a minimum value point of the time series data, based on the differential value of the time series data.

According to an embodiment, the outputting of the spike train signal may include generating a first signal having a first frequency at the maximum value point or the minimum value point of the time series data.

According to an embodiment, the outputting of the spike train signal may include generating a second signal having a second frequency which has a value lower than the first frequency at a point where the differential value of the time series data is positive or negative.

According to an embodiment, the outputting of the spike train signal may further include storing the spike train signal before transmitting the spike train signal to the axons.

According to an embodiment, the outputting of the spike train signal may include generating first random numbers, generating second random numbers having a frequency of occurrence lower than that of the first random numbers, and adjusting the frequency of occurrence of the spike train signal, based on the first random numbers and the second random numbers.

According to an embodiment of the present disclosure, a processor of a spike neural network includes a differentiator that differentiates input time series data, and a detector that determines a point at which a differential value of the time series data is "0", and generates an output value in a discrete form, based on the differential value.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
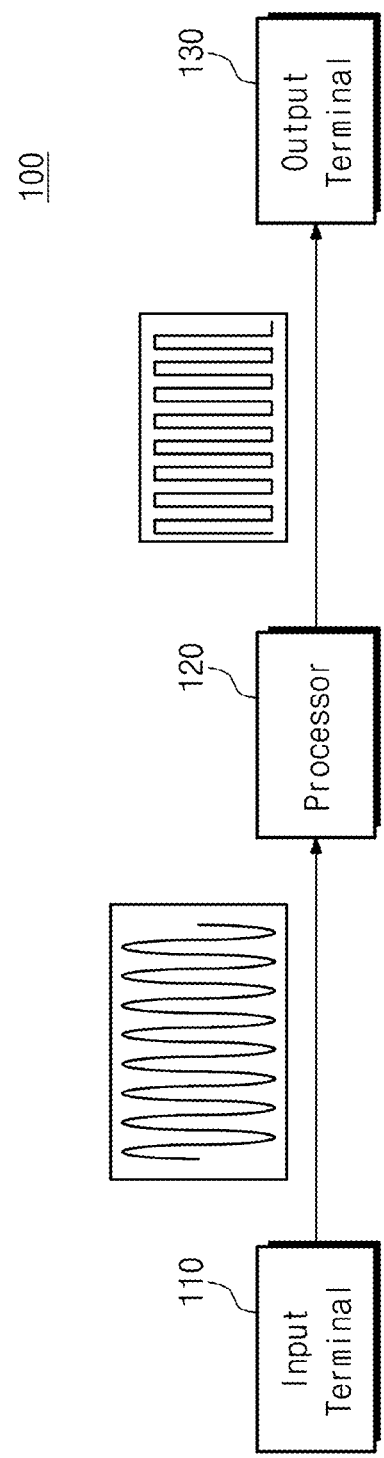
FIG. 1 is a block diagram of a data processing device according to the present disclosure.

Throughout the specification, the same reference numerals refer to the same components. This specification does not describe all elements of the embodiments, and overlaps between general contents or embodiments in the technical field to which the present disclosure pertains are omitted. The term "unit, module, member, or block" used in the specification may be implemented by software or hardware, and according to embodiments, it is also possible that a plurality of "unit, module, member, or block" may be implemented as one component, or that one "part, module, member, or block" includes a plurality of components.

Throughout the specification, when a part is "connected" to another part, this includes a case of being directly connected as well as being connected indirectly, and indirect connection includes connecting through a wireless communication network.

Also, when a part is said to "comprise" a certain component, this means that other components may be further included instead of excluding other components unless specifically stated otherwise.

Throughout the specification, when one member is positioned "on" another member, this includes not only the case where one member abuts another member, but also the case whether another member presents between the two members.

Terms such as first and second are used to distinguish one component from other components, and the component is not limited by the above-described terms.

A singular expression includes a plural expression unless the context clearly has an exception.

In each of steps, an identification code is used for convenience of description, and the identification code does not describe the order of each of the steps, and each of the steps may be performed differently from the specified order, unless a specific order is explicitly stated in the context.

Hereinafter, the principle and embodiments of the present disclosure will be described with reference to accompanying drawings.

FIG. 1 is a block diagram of a data processing device 100 according to the present disclosure.

Referring to FIG. 1, the data processing device 100 according to the present disclosure includes an input terminal 110, a processor 120, and an output terminal 130.

The input terminal 110 receives analog data from the outside. In this case, the analog data are data that is continuous over time and has a time-series characteristic. In detail, the input terminal 110 receives time series data from the outside and transfers the input data to the processor 120.

The processor 120 converts the data provided from the input terminal 110 into a discrete form, and outputs the discretely converted data to the output terminal 130. In detail, the processor 120 differentiates the input time series data, generates an output having a magnitude of "1" at a point where a differential value is "0", and generates an output having a magnitude of "0" at a point where the differential value is not "0". Therefore, since only two types of outputs having the magnitude of "1" and "0" are generated at the point where the differential value of time series data is "0" and the point where the differential value of time series data is not "0", respectively, the processor 120 generates discrete outputs. In addition, the processor 120 may determine a point at which the differential value of the time series data is "0" as a maximum point or a minimum point of the magnitude of the time series data. The detail operations of the processor 120 will be described in detail with reference to FIG. 2.

The output terminal 130 receives the output having the discrete data from the processor 120 and generates an oscillation signal. Also, the output terminal 130 outputs the generated oscillation signal to axons of the spike neural network. In detail, the output terminal 130 receives the discrete data generated based on the differential value of the time series data from the processor 120, generates a signal having a high frequency at the maximum point of the time series data, and generates a signal having a relatively low frequency at the minimum point of the time series data. The detailed operation process of the output terminal 130 will be described in detail with reference to FIGS. 3 and 4.

Figure 2:
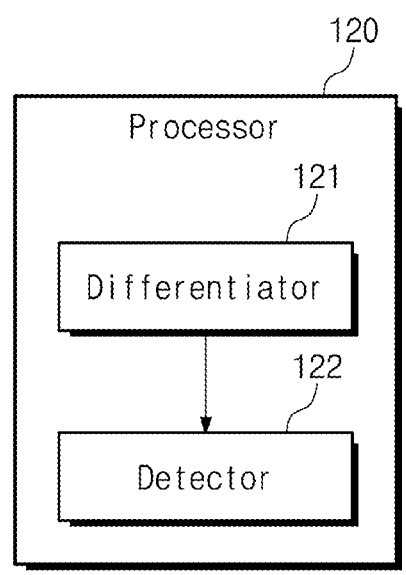
FIG. 2 is a block diagram of a processor of a data processing device according to the present disclosure.

FIG. 2 is a block diagram of the processor 120 of the data processing device 100 according to the present disclosure.

Referring to FIG. 2, the processor 120 may include a differentiator 121 and a detector 122.

The differentiator 121 differentiates the time series data received from the input terminal 110. The differentiator 121 generates data that is the basis for the processor 120 to determine the maximum point and the minimum point of the time series data. In this case, the differentiator 121 may be a high pass filter, but is not limited thereto.

The detector 122 receives the operation result of the differentiator 121 and extracts a point where the differential value of the time series data is "0". In addition, the detector 122 may determine whether each of points in which the differential value is "0" is the maximum point or the minimum point of time series data. The detector 122 extracts points having the differential value of "0", and outputs the extracted data. Also, the detector 122 generates the discrete data, based on the differential value of the time series data. In detail, the detector 122 generates an output having a value of 1 at a point where the differential value of time series data is "0", and generates an output having a value of "0" at a point where the differential value of time series data is not "0". In this case, when the output value is "1", it means a high state, and when the output value is "0", it means a low state.

Figure 3:
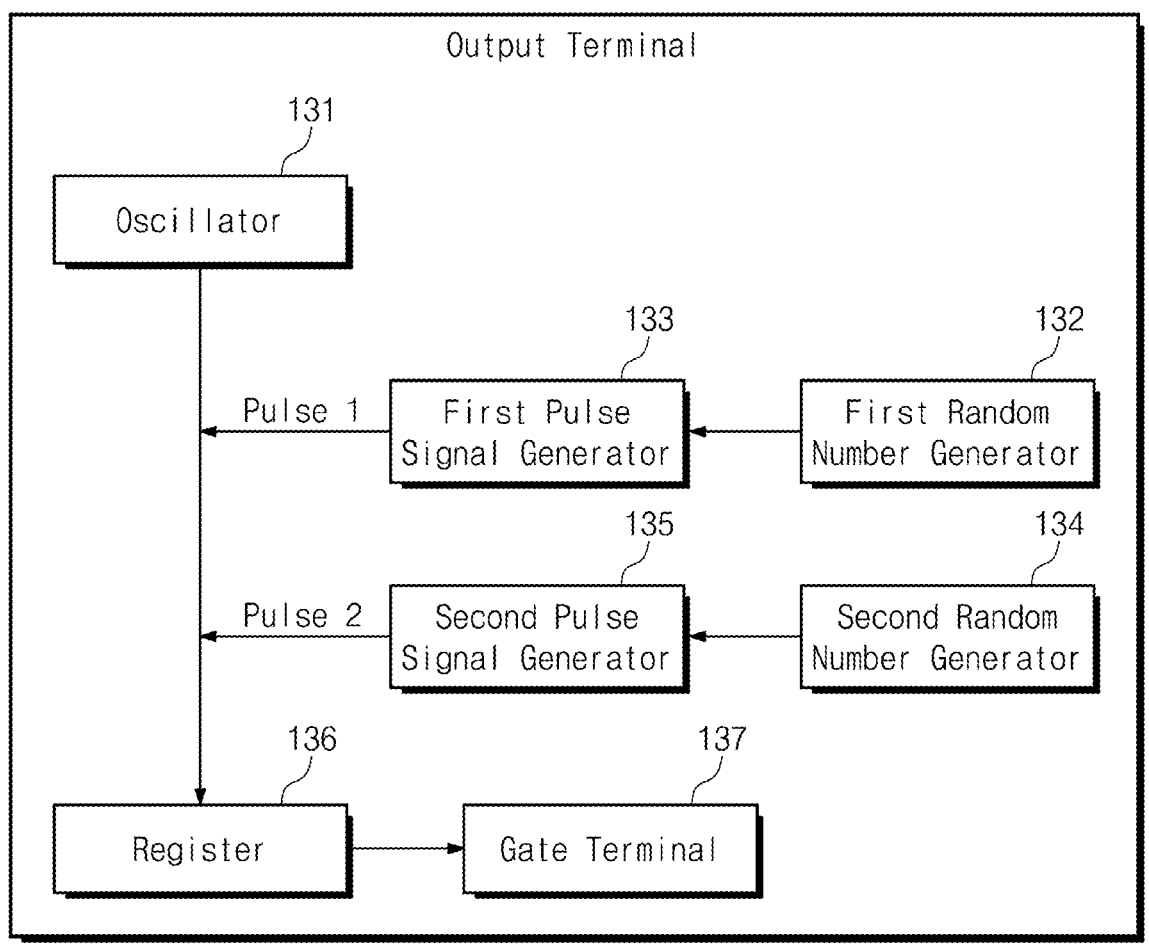
FIG. 3 is a block diagram of an output terminal of a data processing device according to the present disclosure.
Figure 4:
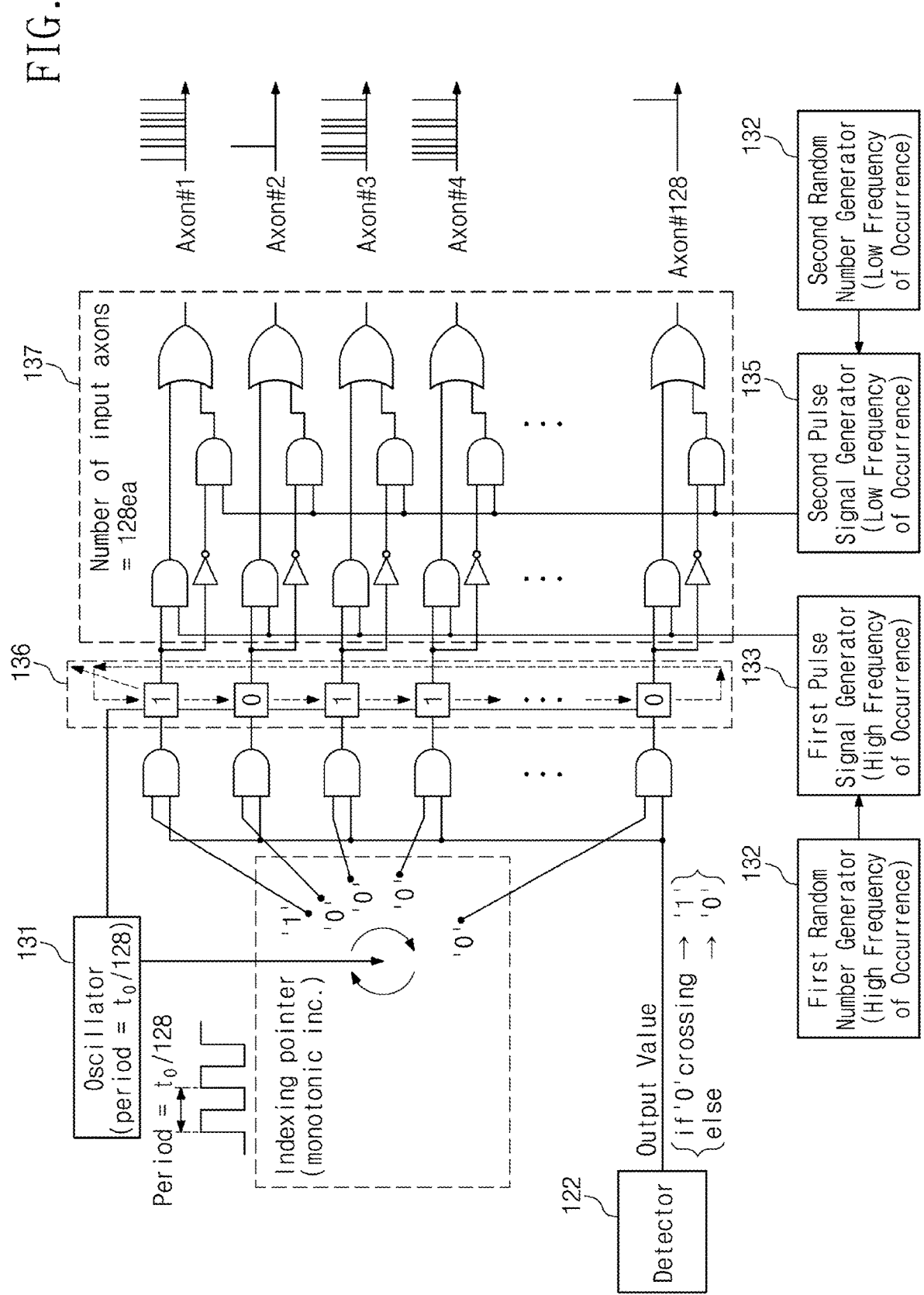
FIG. 4 is a diagram specifically illustrating a configuration of an output terminal of a data processing device according to the present disclosure.

FIG. 3 is a block diagram of the output terminal 130 of the data processing device 100 according to the present disclosure, and FIG. 4 is a diagram specifically illustrating a configuration of the output terminal 130 of the data processing device 100 according to the present disclosure.

The output terminal 130 generates and outputs the oscillation signal corresponding to the discrete data generated by the processor 120. Referring to FIG. 3, the output terminal 130 may include an oscillator 131, a first random number generator 132, a first pulse signal generator 133, a second random number generator 134, a second pulse signal generator 135, a register 136, and a gate terminal 137. Hereinafter, the output terminal 130 of the data processing device 100 according to the present disclosure will be described with reference to FIGS. 3 and 4.

The oscillator 131 outputs an axon index signal in generating a spike train signal transferred from the output terminal 130 to the axon. The axon index signal is a signal for classifying the time series data input to the data processing device 100 into equally spaced time intervals. Accordingly, the oscillator 131 outputs the clock signal CLK at equal intervals. The frequency of the clock signal CLK may be defined based on the number of axons of the spike neural network and a signal input maintain time of the input time series data, but is not limited thereto.

The axon index signal output from the oscillator 131 is used to extract a point at which the differential value of the time series data is "0". In detail, the axon index signal is used as an indexing pointer. The indexing pointer outputs a high signal to AND gates of the gate terminal 137 at a uniform period, and when a signal having a high value is output from the detector 122 of the processor 120, a signal input from the detector 122 may be transferred to the register 136.

The following describes an embodiment in which the signal input maintain time of the time series data is defined as 't0', and the number of axons of the spike neural network is 128. However, the number of axons of the spike neural network is not limited thereto.

The first random number generator 132 and the second random number generator 134 generate random numbers, based on a preset criterion. In this case, the random number generated by the first random number generator 132 is defined as a first random number, and the random number generated by the second random number generator 134 is defined as a second random number. In detail, when a signal having the high value is provided from the processor 120, the first random number generator 132 generates the random numbers to generate a spike train. In addition, when a signal having a low value is provided from the processor 120, the second random number generator 134 generates the random numbers to generate the spike train. Therefore, the first random number is generated at a higher frequency than the second random number. In addition, the first random number and the second random number are the basis for pulse signal generations of the first pulse signal generator 133 and the second pulse signal generator 135, respectively.

The first pulse signal generator 133 and the second pulse signal generator 135 generate a first pulse signal Pulse1 and a second pulse signal Pulse2, based on the first random number and the second random number, respectively, and apply the generated pulse signals to the AND gates of the gate terminal 137. In detail, the first pulse signal is a pulse signal generated when a signal having the high value is provided from the processor 120 and is a pulse signal having a high frequency. In contrast, the second pulse signal is a pulse signal generated when a signal having the low value is provided from the processor 120 and has a lower frequency than the first pulse signal. That is, the first pulse signal is input to the gate terminal 137 at a point where the differential value of the time series data is "0", and the second pulse signal is input to the gate terminal 137 at a point where the differential value of the time series data is "1". When the first pulse signal is input, the output terminal 130 outputs a signal having the spike train with a high frequency of occurrence, and when the second pulse signal is input, the output terminal 130 outputs a signal having the spike train with a relatively low frequency of occurrence. In this case, the spike train signal generated in response to the first pulse signal is defined as a first signal, and a frequency of the first signal is defined as a first frequency. In addition, the spike train signal generated in response to the second pulse signal is defined as a second signal, and a frequency of the second signal is defined as a second frequency.

The register 136 receives the output of the processor 120 from the detector 122 and the axon index signal from the oscillator 131. The register 136 combines the axon index signal and the output of the differentiator 121 to store an output signal of the detector 122. In detail, the register 136 combines the axon index signal and the output of the detector 122, checks the output of the detector 122 whenever the axon index signal is output, and stores the output of the detector 122 depending on whether the differential value of the time series data is "0" or not "0". When the differential value of the time series data is "0" and the output of the detector 122 is the high, the register 136 stores the output of the detector 122. When the differential value of the time series data is not "0" and the output of the detector 122 is the low, the register 136 does not store the output of the detector 122.

The gate terminal 137 includes a plurality of AND gates, a plurality of NOT gates, and a plurality of OR gates. In detail, each of the plurality of AND gates receives the first pulse signal or the second pulse signal, and the detector 122 outputs a spike train signal Axon #n when a high output is received. The spike train signal Axon #n is a signal input to the spike neural network and corresponds to the number of axons present in the spike neural network. In an embodiment disclosed in FIG. 4, for example, the spike train signals Axon #1 to Axon #128 are output with respect to 128 axons.

Referring to FIG. 4, when the high output is provided from the detector 122, the gate terminal 137 outputs the spike train signal having the high value. However, when a low output is provided from the detector 122, the gate terminal 137 does not output the spike train signal.

In addition, the gate terminal 137 may adjust the frequency of occurrence of each of the spike train signals Axon #n, based on the first random number or the second random number. When the high output is provided from the detector 122, since the first pulse signal generated based on the first random number is input to the gate terminal 137, the frequency of occurrence of the spike train signal Axon #n is relatively high. However, when the low output is provided from the detector 122, since the second pulse signal generated based on the second random number is input to the gate terminal 137, the frequency of occurrence of the spike train signal Axon #n is relatively low.

Figure 5A:
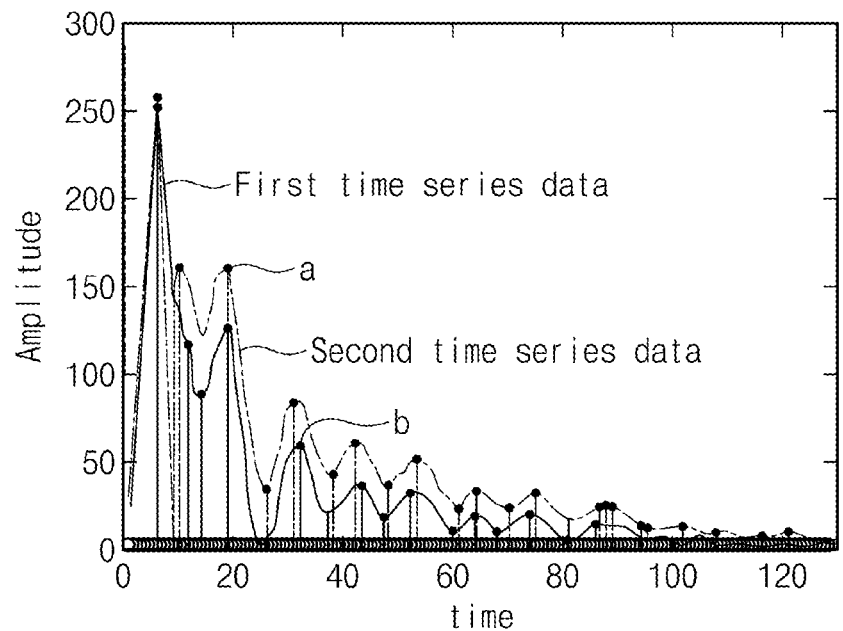
FIG. 5A is a diagram illustrating time series data input to a data processing device according to the present disclosure.
Figure 5B:
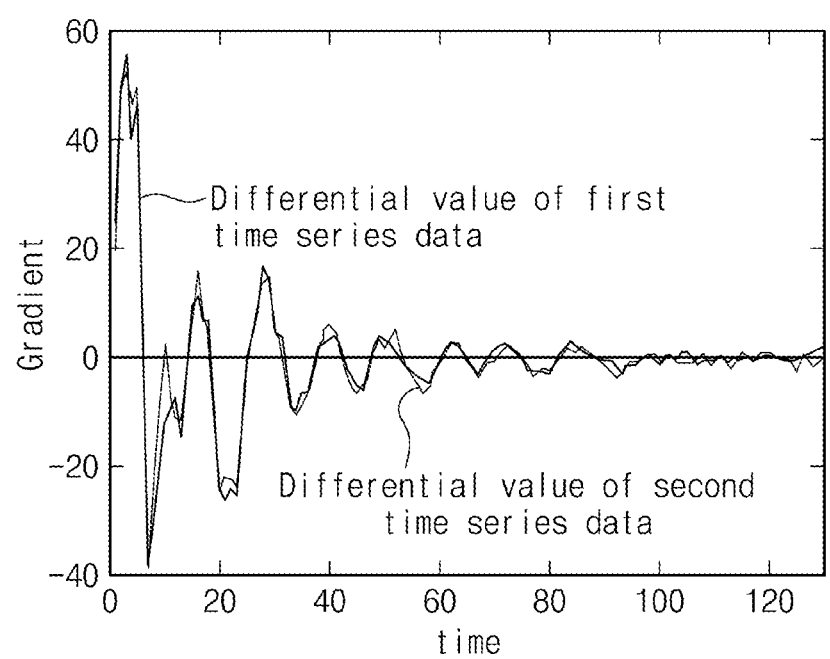
FIG. 5B is a diagram illustrating a differential value of time series data input to a data processing device according to the present disclosure.

FIG. 5A illustrates an example of the time series data input to the data processing device 100 according to the present disclosure, and FIG. 5B illustrates an example of the differential value of the time series data input to a data processing device 100 according to the present disclosure. In FIG. 5A, an x-axis represents a time, and a y-axis represents the amplitude of the time series data. In FIG. 5B, an x-axis represents a time, and a y-axis represents the differential value (i.e., a gradient) of the time series data.

Referring to FIGS. 5A and 5B, the maximum value and the minimum value of the first time series data and the second time series data occur at different times, respectively. The processor 120 may distinguish between the first time series data and the second time series data by utilizing the fact that time points at which the maximum point and the minimum point of the first time series data and the second time series data occur are different from each other. The processor 120 may utilize the result of first-order differentiation of the time series data to extract the maximum point and the minimum point of the input time series data. When the result of the first differentiation of each time series data is "0", the processor 120 may determine that the maximum point or the minimum point of each time series data. Referring to graphs of FIGS. 5A and 5B, first-order differential values of the first time series data and the second time series data appear as "0" at different points, and the processor 120 and the output terminal 130 classify the data by indexing the point in which the first-order differential value of the time series data is "0".

In detail, referring to the graphs of FIGS. 5A and 5B, when each time series data is superimposed and finely divided on a time axis, points where the maximum and minimum values exist are different depending on the time series data. For example, the maximum value of the first time series data appears at point 'a' and the maximum value of the second time series data appears at point 'b' in finely divided indexes on the time axis. When the first-order differential value of the time series data at the point where the axon index signal is generated is "0", the output terminal 130 determines that the corresponding point is a point where the maximum value/the minimum value appears, based on an axon index signal generated depending on a sequence of time at equal intervals, and the output terminal 130 sets a value of the corresponding register 136 to "1". However, when the first-order differential value of the time series data at the point where the axon index signal is generated is not "0", the output terminal 130 determines that the corresponding point is not a point where the maximum value/the minimum value appears, based on the axon index signal generated depending on the sequence of time at equal intervals, and the output terminal 130 sets a value of the corresponding register 136 to "0". Through the above-described method, the processor 120 may determine whether the maximum/minimum value appears at the corresponding point, based on the index obtained by finely dividing each time series data into equal intervals on the time axis, and the output terminal 130 may determine whether to output the spike train signal at the high frequency or at the low frequency.

Figure 6:
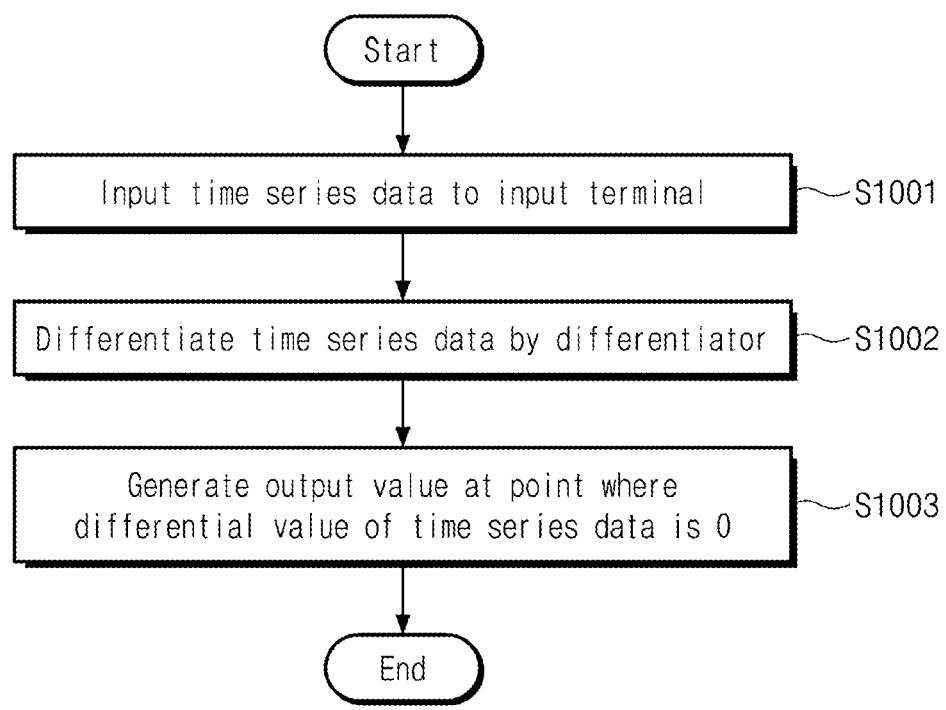
FIG. 6 is a flowchart describing how a data processing device according to the present disclosure processes time series data.

FIG. 6 is a flowchart describing how the data processing device 100 according to the present disclosure processes the time series data.

Referring to FIG. 6, when time series data are input to the input terminal 110 (S1001), the differentiator 121 of the processor 120 differentiates the input time series data (S1002).

When the differentiator 121 differentiates the input time series data, the data processing device 100 may generate the output value at a point where the differential value of the time series data is "0" (S1003). In detail, the data processing device 100 determines the maximum point or the minimum point of the time series data at a point where the differential value of the time series data is "0", and may generate the spike train signal by combining the output value of the processor 120 and the axon index signal that is input based on preset criteria at a point where the differential value of the time series data is "0". In this case, the spike train signal occurs at a high frequency at the maximum point or the minimum point of time series data, and occurs at a low frequency in portions other than the maximum point and the minimum point of the time series data.

Figure 7:
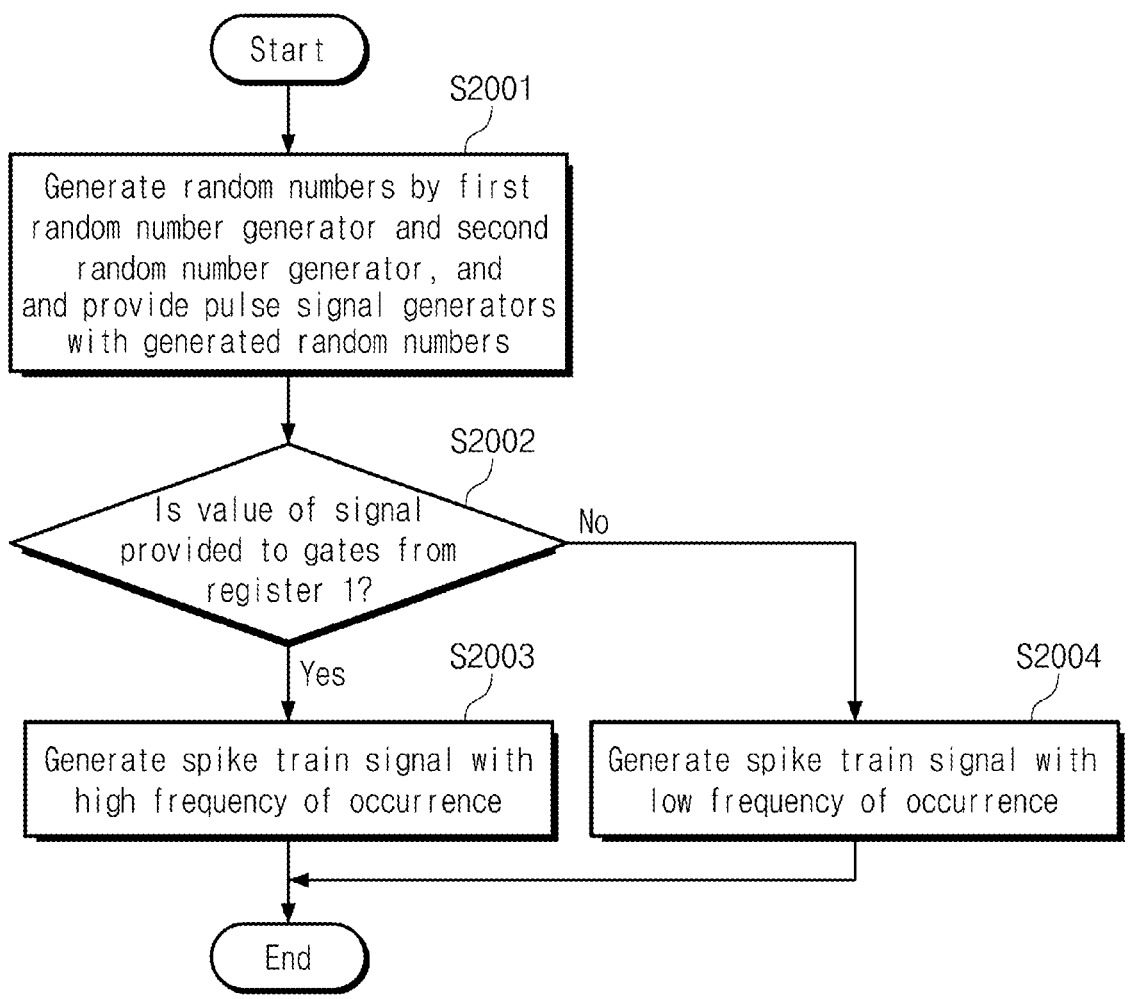
FIG. 7 is a flowchart describing how a data processing device according to the present disclosure generates a spike train signal.

FIG. 7 is a flowchart describing how the data processing device 100 according to the present disclosure generates the spike train signal.

The first random number generator 132 and the second random number generator 134 generate the first random number and the second random number, respectively, and provide the first pulse signal generator 133 and the second pulse signal generator 135 with the first random number and the second random number, respectively (S2001).

When the first random number and the second random number are input to the first pulse signal generator 133 and the second pulse signal generator 135, respectively, the gate terminal 137 of the output terminal 130 may determine whether the value of the signal provided from the register 136 is "1" (S2002). In detail, when signals provided to the AND gates of the gate terminal 137 from the first pulse signal generator 133 and the second pulse signal generator 135 are the high value, and signals provided to the AND gates of the gate terminal 137 from the register 136 are "1", outputs of the AND gates of the gate terminal 137 will also be "1". Accordingly, the gate terminal 137 of the output terminal 130 may determine that the value of the signal provided from the register 136 is "1".

When the value of the signal provided to the gate terminal 137 from the register 136 is "1", the OR gates of the output terminal 130 generate the spike train signal with the high frequency of occurrence (S2003). However, when the value of the signal provided to the gate terminal 137 from the register 136 is "0", the OR gates of the output terminal 130 generate the spike train signal with the low frequency of occurrence (S2004). In detail, when the value of the signal provided to the gate terminal 137 from the register 136 is "1", this is a point where the differential value of the time series data is "0", and thus the first random number is generated and the spike train signal with the high frequency may be output. However, when the value of the signal provided to the gate terminal 137 from the register 136 is "0", this is a point where the differential value of the time series data is not "0", and thus the second random number is generated and the spike train signal with the low frequency may be output.

According to an embodiment of the present disclosure, it is possible to provide a data processing device that converts time series data into discrete data.

In addition, according to an embodiment of the present disclosure, in converting time series data into discrete data, by providing a processor including a differentiator, a data processing device that determines a maximum value and a minimum value of time series data may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A data processing device for a spike neural network, the device comprising: an input terminal configured to receive time series data that are analog data; a processor configured to differentiate, using a high pass filter, the time series data, to determine a point at which a differential value of the time series data is "0", and to generate an output in a discrete form based on the determination result; and an output terminal configured to generate a spike train signal with a first frequency or a second frequency based on the output in the discrete form, and to transfer the generated spike train signal to axons of the spike neural network, the spike train signal being in the form of spikes, wherein the processor determines a maximum value point or a minimum value point of the time series data at the point at which the differential value of the time series data is "0", wherein the output terminal is configured to:

generate first random numbers; and generate second random numbers having a frequency of occurrence lower than that of the first random numbers, and wherein the output terminal adjusts the first frequency and the second frequency based on the first random numbers and the second random numbers, respectively.

2. The data processing device of claim 1, wherein the processor determines the output as a value of "1" when the differential value of the time series data is "0".

3. The data processing device of claim 1, wherein the output terminal generates the spike train signal with the first frequency at the maximum value point or the minimum value point of the time series data.

4. The data processing device of claim 3, wherein the output terminal generates the spike train signal with the second frequency at a point where the differential value of the time series data is positive or negative, the second frequency being lower than the first frequency.

5. The data processing device of claim 1, wherein the output terminal further includes an index register storing the spike train signal before transferring the spike train signal to the axons of the spike neural network.

6. The data processing device of claim 5, wherein the output terminal is configured to generate an index signal that corresponds to a clock signal, and to allow the output of the processor to be stored in the index register based on the index signal.

7. A data processing method for a spike neural network, the method comprising:

receiving time series data through an input terminal, the time series data being analog data;

differentiating, using a high pass filter, the time series data, determining a point at which a differential value of the time series data is "0", and generating an output value in a discrete form based on the determination result; and generating a spike train signal with a first frequency or a second frequency based on the output value, and transferring the generated spike train signal to axons of the spike neural network, the spike train signal being in the form of spikes, wherein the determining includes determining a maximum value point or a minimum value point of the time series data at the point at which the differential value of the time series data is "0" and wherein the generating of the spike train signal includes:

generating first random numbers;

generating second random numbers having a frequency of occurrence lower than that of the first random numbers; and adjusting the first frequency and the second frequency based on the first random numbers and the second random numbers, respectively.

8. The method of claim 7, wherein the generating of the output value includes determining the output value as a value of "1" when the differential value of the time series data is "0".

9. The method of claim 7, wherein the generating of the spike train signal includes generating the spike train signal with the first frequency at the maximum value point or the minimum value point of the time series data.

10. The method of claim 9, wherein the generating of the spike train signal includes generating the spike train signal with the second frequency at a point where the differential value of the time series data is positive or negative, the second frequency being lower than the first frequency.

11. The method of claim 7, further comprising storing the spike train signal before transferring the spike train signal to the axons of the spike neural network.

12. The data processing device of claim 6, wherein a frequency of the clock signal is defined based on a number of axons of the spike neural network and a signal input maintain time of the time series data.

13. The method of claim 7, wherein the generating of the spike train signal includes storing the spike train signal in an index register based on an index signal before transferring the spike train signal to the axons of the spike neural network, wherein the index signal corresponds to a clock signal having a frequency defined based on a number of axons of the spike neural network and a signal input maintain time of the time series data.

* * * * *